(12) United States Patent
Konar et al.

(10) Patent No.: US 12,544,931 B2
(45) Date of Patent: Feb. 10, 2026

(54) APPARATUS AND METHOD FOR CONTROLLING ROBOTIC MANIPULATORS

(71) Applicant: SAMSUNG ELECTRONICS CO., LTD., Suwon-si (KR)

(72) Inventors: Abhisek Konar, Montreal (CA); Oliver Limoyo, Mississauaga (CA); Francois Hogan, St. Jean Sur Richelieu (CA); Gregory Lewis Dudek, Westmount (CA); Trevor Ablett, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 178 days.

(21) Appl. No.: 18/506,672

(22) Filed: Nov. 10, 2023

(65) Prior Publication Data
US 2024/0308082 A1 Sep. 19, 2024

Related U.S. Application Data

(60) Provisional application No. 63/452,050, filed on Mar. 14, 2023.

(51) Int. Cl.
*B25J 9/16* (2006.01)

(52) U.S. Cl.
CPC ............ *B25J 9/1697* (2013.01); *B25J 9/161* (2013.01); *B25J 9/1612* (2013.01); *B25J 9/163* (2013.01); *B25J 9/1664* (2013.01); *B25J 9/1669* (2013.01)

(58) Field of Classification Search
CPC . B25J 9/161; B25J 9/163; B25J 9/1628; B25J 9/1664; B25J 9/1669; B25J 9/1679; B25J 9/1687; B25J 9/1694; B25J 9/1697
See application file for complete search history.

(56) References Cited

U.S. PATENT DOCUMENTS

| | | |
|---|---|---|
| 10,059,005 B2 | 8/2018 | Huang et al. |
| 11,607,807 B2 | 3/2023 | Khansari Zadeh et al. |
| 11,673,264 B2 | 6/2023 | Nikovski et al. |
| 11,707,845 B2 | 7/2023 | Enomoto et al. |
| 11,813,756 B2 | 11/2023 | Zhao et al. |
| 11,911,912 B2 | 2/2024 | Lee et al. |

(Continued)

FOREIGN PATENT DOCUMENTS

| | | |
|---|---|---|
| JP | 2021-3779 A | 1/2021 |
| JP | 2021-169149 A | 10/2021 |

OTHER PUBLICATIONS

Communication issued on May 24, 2024 by the International Searching Authority in International Application No. PCT/KR2024/095301 (PCT/ISA/220, PCT/ISA/210, and PCT/ISA/237).

*Primary Examiner* — Spencer D Patton
(74) *Attorney, Agent, or Firm* — Sughrue Mion, PLLC

(57) ABSTRACT

A method for controlling a robot including a manipulator is provided. The method may include: acquiring an image of a scene including a target object; inputting the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and commanding the robot to position the manipulator according to the object placement pose, to place the target object at a designated location.

19 Claims, 13 Drawing Sheets

(56) References Cited

U.S. PATENT DOCUMENTS

2020/0094405 A1* 3/2020 Davidson ............... B25J 9/1669
2022/0072706 A1   3/2022 Wagner et al.
2022/0075355 A1* 3/2022 Enomoto ................ G06F 16/24
2022/0355474 A1  11/2022 Ye et al.
2023/0173660 A1* 6/2023 Wang ..................... B25J 9/1697
                                                            700/262

* cited by examiner

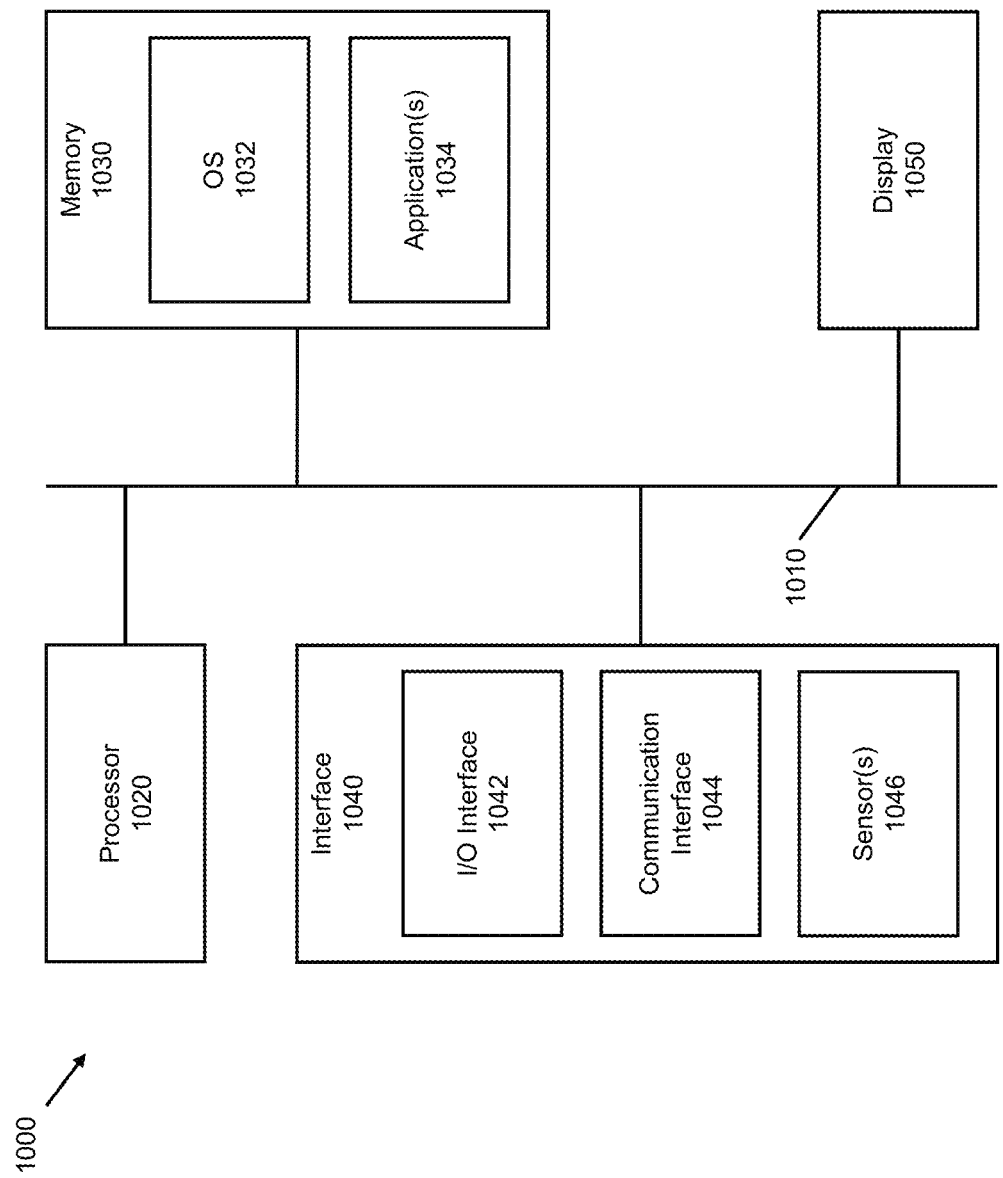

APPARATUS AND METHOD FOR CONTROLLING ROBOTIC MANIPULATORS

CROSS-REFERENCE TO RELATED APPLICATION(S)

This application is based on and claims priority under 35 U.S.C. § 119 to U.S. Provisional Patent Application No. 63/452,050 filed on Mar. 14, 2023, in the U.S. Patent & Trademark Office, the disclosure of which is incorporated herein by reference in its entirety.

BACKGROUND

1. Field

The disclosure relates to an apparatus and a method for controlling robotic manipulators, and particularly, relates to an apparatus and a method for generating training data for an artificial intelligence (AI) model, and controlling the robotic manipulators using the AI model.

2. Description of Related Art

Object placement is an important daily task for autonomous robotic manipulators. Examples of the object placement include household activities like setting tables or loading dishwashers. Robotic placement involves contact-rich interactions and typically requires vision-based feedback to account for the state of an in-hand object and the surroundings.

Developing effective object placement policies is intricate, and may involve solving numerous complex subtasks, including object tracking, scene understanding, motion planning, and control. Imitation learning (IL) presents an appealing, simple, and practical approach by learning end-to-end vision-based control policies from expert demonstrations. Given the intricacy of the real world, a demonstration dataset may need to cover diverse instances to encompass various factors such as backgrounds, lighting, and object types. A major bottleneck for imitation learning-based approaches is a substantial human time and effort necessary to collect expert demonstrations.

SUMMARY

According to an aspect of the present disclosure, there is provided an electronic device for controlling a robot including a manipulator, the electronic device including: one or more processors configured to: acquire an image of a scene including a target object; input the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and command the robot to position the manipulator according to the object placement pose, to place the target object at a designated location.

The electronic device may further include a vision sensor configured to capture the image of the scene including the target object.

The object placement pose of the manipulator that is output from the control policy model may include: information of rotational positions including a yaw angle, a pitch angle, and a roll angle of the manipulator; and information of transitional positions including an x-direction position, a y-direction position, and a z-direction position of the manipulator.

The data collection system may be configured to: obtain a first set of manipulator grasping poses via a grasping planning neural network; obtain a second set of manipulator grasping poses by pruning grasping poses that do not belong to an object class of interest, from the first set of grasping poses; determine a grasping pose from the second set of manipulator grasping poses; and obtain the object retrieval trajectory that extends from the determined grasping pose to a clearance pose.

The data collection system may include a tactile sensor mounted on the manipulator and configured to: identify a center position of a plurality of contact points in a contact area between the tactile sensor and the target object; determine a position vector for changing the center position of the plurality of contact points to a predetermined stable position; and output a robot control command based on the position vector.

The data collection system may be configured to command the robot to re-grasp the target object based on the robot control command including the position vector to acquire the object retrieval trajectory.

The data collection system may be further configured to: determine a retrieval pose of the manipulator based on a movement path extending from a grasping pose to a clearance pose of the manipulator; position the manipulator according to the retrieval pose and store the retrieval pose to generate the object retrieval trajectory based on the retrieval pose; downsample the object retrieval trajectory to match a predetermined control policy frequency; reverse the downsampled object retrieval trajectory into the object placement trajectory; and generate the control policy model by training a policy learning model based on the object placement trajectory and the image of the scene including the target object.

The data collection system may be configured to command the robot to position the manipulator at a grasping position, change a rotational stiffness level and a translation stiffness level of the manipulator from original values to predetermined minimum values, commands the robot to close a gripper of the manipulator, and acquire the object retrieval trajectory while the rotational stiffness level and the translation stiffness level are set to the predetermined minimum values.

The control policy model may include one or more convolutional neural networks (CNNs), followed by a multilayer perceptron (MLP) layer that maps an output of the CNNs into parameters of a distribution of robot control actions.

According to another aspect of the present application, there is provided a method for controlling a robot including a manipulator, the method including: acquiring an image of a scene including a target object; inputting the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and commanding the robot to position the manipulator according to the object placement pose, to place the target object at a designated location.

The object placement pose of the manipulator may include: information of rotational positions including a yaw angle, a pitch angle, and a roll angle of the manipulator; and information of transitional positions including an x-direction position, a y-direction position, and a z-direction position of the manipulator.

The method may further include acquiring the object retrieval trajectory by: obtaining a first set of manipulator grasping poses via a grasping planning neural network; obtaining a second set of manipulator grasping poses by pruning grasping poses that do not belong to an object class of interest, from the first set of grasping poses; determining a grasping pose from the second set of manipulator grasping poses; and acquiring the object retrieval trajectory that extends from the determined grasping pose to a clearance pose.

A tactile sensor may be mounted on the manipulator, and the method may further include acquiring the object retrieval trajectory by: identifying a center position of a plurality of contact points in a contact area between the tactile sensor and the target object; determining a position vector for changing the center position of the plurality of contact points to a predetermined stable position; outputting a robot control command based on the position vector to place the manipulator at the predetermined stable position; and acquiring the object retrieval trajectory by executing an object retrieval task from the predetermined stable position.

The method may further include acquiring the object placement trajectory by: downsampling the object retrieval trajectory to match a predetermined control policy frequency; reversing the downsampled object retrieval trajectory into the object placement trajectory; and generating the control policy model by training a policy learning model based on the object placement trajectory and the image of the scene including the target object.

The method may further include acquiring the object retrieval trajectory by: commanding the robot to position the manipulator at a grasping position; changing a rotational stiffness level and a translation stiffness level of the manipulator from original values to predetermined minimum values; commanding the robot to close a gripper of the manipulator, and acquiring the object retrieval trajectory while the rotational stiffness level and the translation stiffness level are set to the predetermined minimum values.

The control policy model may include one or more convolutional neural networks (CNNs), followed by a multilayer perceptron (MLP) layer that maps an output of the CNNs into parameters of a distribution of robot control actions.

According to another aspect of the present disclosure, there is provided a non-transitory computer-readable storage medium storing instructions executable by one or more processors to perform a method for controlling a robot including a manipulator. The method may include: acquiring an image of a scene including a target object; inputting the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and commanding the robot to position the manipulator according to the object placement pose, to place the target object at a designated location.

The method may further include acquiring the object retrieval trajectory by: commanding the manipulator to grasp the target object at a grasping position; determining whether the manipulator is in a stable grasp state based on an tactile sensor image showing contact points between the manipulator and the target object; controlling the manipulator to re-grasp the target object based on the manipulator being in an unstable grasp state; and based on the manipulator being in the unstable grasp state, controlling the manipulator to move from the grasping position to a clearance position to acquire the object retrieval trajectory.

The method may further include acquiring the object retrieval trajectory by: setting rotational and translation stiffness levels to predetermined minimum level while the manipulator moves from the grasping position to the clearance position to acquire the object retrieval trajectory.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 12 is a diagram of components of one or more electronic devices of FIG. 11 according to an embodiment.

DETAILED DESCRIPTION

Figure 1A:
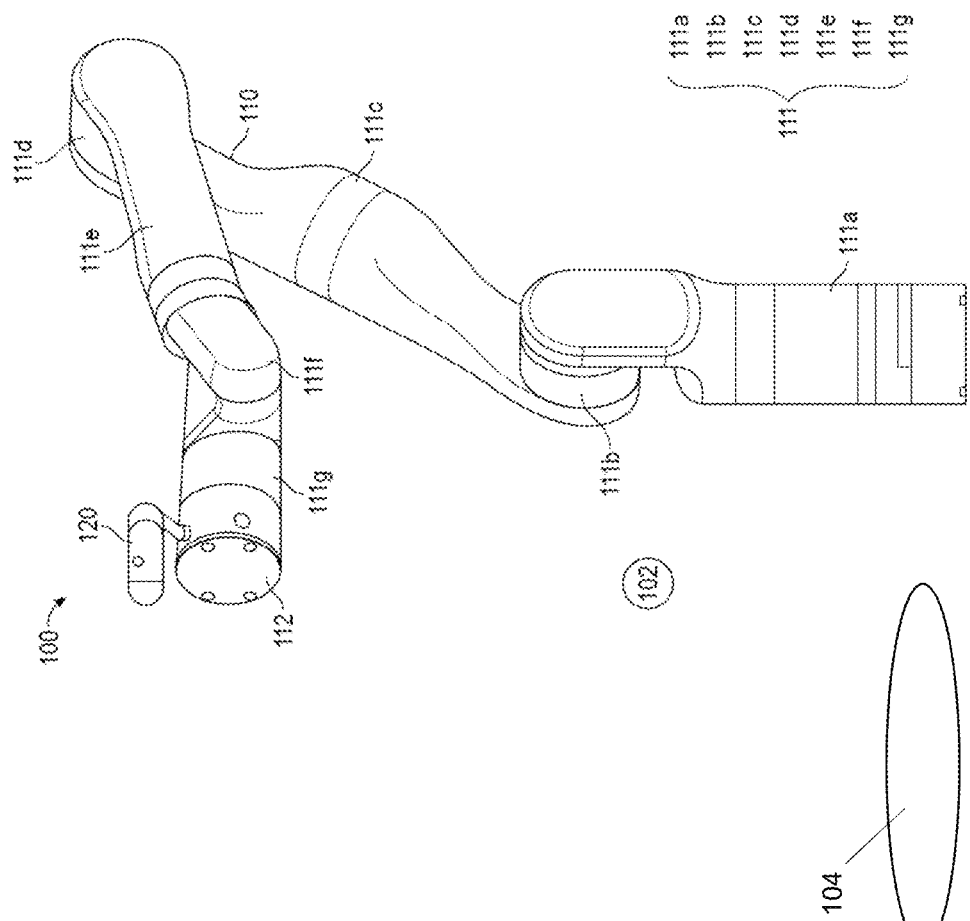
FIGS. 1A-1B are block diagrams of a configuration of a system for controlling a robot including a manipulator, according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

In one or more embodiments of the present disclosure, a learning to place by picking (LPP) method is utilized to automate a collection of training data for training an AI model configured to generate a robot arm trajectory to place an object and control a pose of the robot arm based on the generated robot arm trajectory. To autonomously gather placement demonstration data (also referred to as "placement training data" or "object placement trajectory data"), a self-supervised process may be used to obtain picking demonstration data and convert the picking demonstration data to placement demonstration data, based on a cyclical nature and inherent symmetry of the pick and place problem.

A picking phase (i.e., grasping and retrieving) may offer training supervision or labels for a placement task, as picking and placing can be alternately performed by reversing a retrieval trajectory. A placement policy is generated based on this LPP approach, to be utilized beyond a training environment and in scenarios where objects are not initially positioned at their target locations.

The LLP method uses the concept of working backwards to the challenge of robotic object placement. An object is assumed to be in its intended place configuration during data collection. A robot manipulator may pick the object and reverse back to an initial location to generate data. The LLP method enables the robot manipulator to independently collect demonstration data within a larger scene containing multiple objects and varied placement positions.

The LLP method may use a self-supervised technique for collecting data in 6-degrees of freedom (DOF) robotic object placement tasks. The data collection may be conducted based on tactile re-grasping and compliant control for grasping to achieve uninterrupted data collection without human intervention. A real-world experimental validation is conducted on the LLP method by using the collected data to train a vision-based control policy capable of placing multiple objects (e.g., plates) in an intended place (e.g., a dish rack).

Various embodiments of the present disclosure will be described in detail with reference to the drawings below.

Figure 1B:
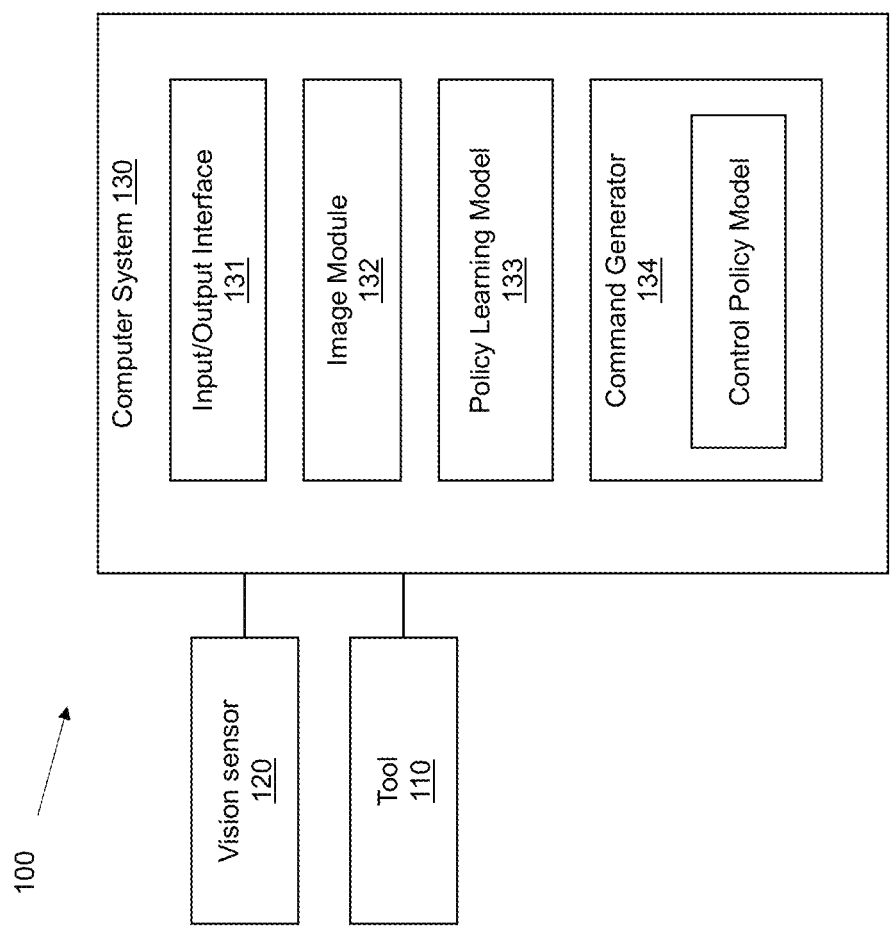

FIGS. 1A-1B are block diagrams of a configuration of a system for controlling a robot including a manipulator, in accordance with embodiments.

As shown in FIGS. 1A and 1B, an apparatus 100 according to embodiments may include a tool 110, a vision sensor 120, and a computer system 130. The computer system 130 may include an input/output interface 131, an image module 132, a policy learning model 133, and a command generator 134.

In the apparatus 100, the image module 132 may be omitted when the policy learning model 133 and the command generator 134 use images directly received from the vison sensor 120. Additionally, if the apparatus 100 does not support on-device learning, the apparatus 100 may omit the policy learning model 133, and the command generator 133 may use a pre-trained control policy model.

The apparatus 100 may receive a task to be performed on a target object 102, and may estimate a movement path (i.e., trajectory) of the tool 110 to perform the task. For example, the apparatus 100 may train the policy learning model 133 that accepts as input an image of the target object 102 and a scene 104 into which the target object 102 is to be placed, and an object placement trajectory which is acquired by reversing an object retrieval trajectory, and generates as output a control policy for controlling a pose of the tool 110 to place the target object 102 at a location in the scene 104. The control policy may represent a neural network model configured to receive as input an image of the target object 102 and a scene 104, and generate pose information of the tool 110 for placing the target object 102 at a location in the scene 104. The pose information of the tool 110 may include rotational positions and transitional positions of the manipulator attached at an end of the tool 110 for placing the target object 102 at a location in the scene 104. The command generator 134 may use a neural network model (hereinafter "control policy model" or "control policy neural network"), which implements the control policy learned from the policy learning model 133, to provide a robot control command. Specifically, the control policy model may receive an image of the target object 102 and the scene 104 as input, and generate as output a robot control command including the pose information of the tool 110.

Hereinafter, the elements of the apparatus 100 are described in further detail.

The tool 110 may be operated under the control of the computer system 130 to manipulate the target object 102. In embodiments, the tool 110 may be a robot arm having a manipulator 112 positioned at one end thereof. The manipulator 112 may include a device such as an end-effector for interacting with the target object 102. Examples of the end-effector may include grippers, scoops, tweezers, force-torque sensors, material removal tools, welding torches, collision sensors, and tool changers, and the types of the end-effector are not limited thereto. Examples of the target object 102 to be manipulated by the tool 110 may include a hook, a cup, a container, a bag, and the like. For example, when a gripper of a robot arm is used as the manipulator 112, the command generator 134 may generate a robot control command to control the gripper to grasp, lift, and place the target object 102.

In embodiments, the tool 110 may include one or more joints 111. For example, the joints 111 may include a joint 111a, a joint 111b, a joint 111c, a joint 111d, a joint 111e, a joint 111f, and a joint 111g, each of which may be located at different positions along the tool 110. In embodiments, the tool 110 may move the manipulator 112 to a desired position in space by rotating, moving, or otherwise operating at least one of the joints 111 based on a robot control command. For example, based on the robot control command, the tool 110 may move and rotate the joints 111 to cause the manipulator 112 to be placed at a position that is suitable for placing the target object 102 in the scene 104.

The vision sensor 120 may include one or more cameras, and may be configured to capture images of at least one of the tool 110, the target object 102, and the scene 104 in which the target object 102 is to be placed. For example, in embodiments, the vision sensor 120 may be attached to the robot arm such that the vision sensor 120 is located at a fixed position with respect to the manipulator 112, and therefore the vision sensor 120 may be moved by the robot arm along with the manipulator 112 according to the movements of the joints 111. The vision sensor 120 may be implemented as or include at least one of an red/green/blue (RGB) camera and an RGB depth (RGBD) camera, however embodiments are not limited thereto.

The image module 132 may control the vision sensor 120 to obtain the images discussed above, and may provide the images to the policy learning model 133 and the command generator 133. In embodiments, the image module 132 may perform processing on the images. For example, in some embodiments the image module 132 may obtain depth information based on multiple RGB images of the target object 102 or the scene 104, and may provide the depth information to the policy learning model 133 and the command generator 133. Additionally, when a data collection system 310 (see FIG. 3) is incorporated into the computer system 130, the image module 132 may generate a point cloud image of the target object 102 and the scene 104 and provide the point cloud image to the data collection system 310. When the apparatus 100 does not support on-device learning, the apparatus 100 may omit the data collection system 310 and the policy learning model 133, and the command generator 133 may use a pre-trained control policy model.

The input/output interface 131 may enable communications between the tool 110, the vision sensor 120, and the computer system 130. The input/output interface 131 may include a transceiver and/or a separate receiver and transmitter that enables the computer system 130 to communicate with other devices, such as via a wired connection, a wireless connection, or a combination of wired and wireless connections. The input/output interface 131 may permit the computer system 130 to receive information from another device and/or provide information to another device. For example, the input/output interface 131 may include an Ethernet interface, an optical interface, a coaxial interface, an infrared interface, a radio frequency (RF) interface, a universal serial bus (USB) interface, a Wi-Fi interface, a cellular network interface, or the like. In embodiments, the computer system 130 may be included in another element such as the tool 110 or the manipulator 112, or may be separate from and external to the other elements of the apparatus 100.

The image module 132, the policy learning model 133, and the command generator 134 may be implemented by at least one processor and at least one memory.

The processor may be implemented in hardware, firmware, or a combination of hardware and software. The processor may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor may include one or more processors capable of being programmed to perform a function. The processor may access the memory and execute computer readable program instructions that are stored in the memory.

The memory may store information, data, an operating system, a plurality of program modules related to the operation and use of the apparatus 100. For example, the memory may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory may include program instructions and codes configured to be executed by the processor to perform the operations of the image module 132, the policy learning model 133, and the command generator 134.

Figure 2:
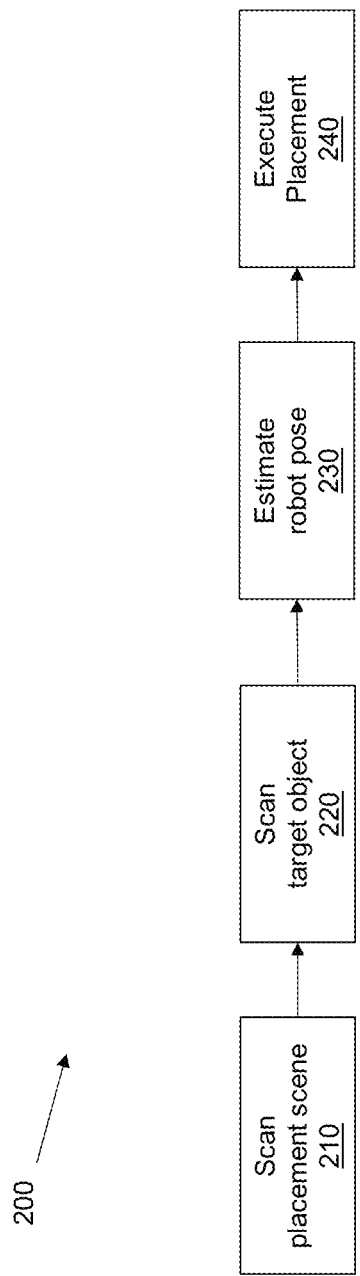
FIG. 2 illustrates a process of controlling a robot including a manipulator, according to embodiments of the present disclosure.

FIG. 2 illustrates a process of controlling a robot including a manipulator, according to embodiments of the present disclosure. In embodiments, the operations illustrated in FIG. 2 may be performed using any element described herein, for example the apparatus 100 or any element thereof.

As shown in FIG. 2, the process 200 may include scanning the scene 104 in operation 210, and scanning the target object 102 in operation 220. In embodiments, the scanning may refer to or include obtaining images using the vision sensor 120. For example, in operation 210 the vision sensor 120 may obtain one or more images of the scene 104 using an RGB camera or an RGBD camera, and in operation 220 the vision sensor 120 may obtain an image of the target object 102 using the RGB camera or the RGBD camera. Operations 210 and 220 may occur as multiple steps, involving the capture of an image of the placement scene and the target object separately, or as a single step capturing an image of the placement scene including the target object.

As further shown in FIG. 2, in operation 230 the process 200 may include estimating a pose of the manipulator 112 for placing the target object 102 in the scene 104. The pose of the manipulator 112 may include rotational positions (e.g., yaw, pitch, and roll positions) and transitional positions (e.g., x, y, and z coordinates) of the manipulator 112. In another example, the pose of the manipulator 112 may include a change in the rotation positions and the translation positions of the manipulator 112 from a current pose to a next pose.

In operation 230, the command generator 134 may determine the pose of the manipulator 112 by inputting the 2D or 3D images of the target object 102 and the scene 104 into the control policy model and obtaining pose information for the manipulator 112 as an output of the control policy model.

As further shown in FIG. 2, in operation 240 the process 200 may include placing the target object 102 at a location in the scene 104. For example, the command generator 134 may generate a robot control command based on the pose information and control the tool 110 to place the target object at the location in the scene 104 and release the target object 102 based on the robot control command.

Figure 3:
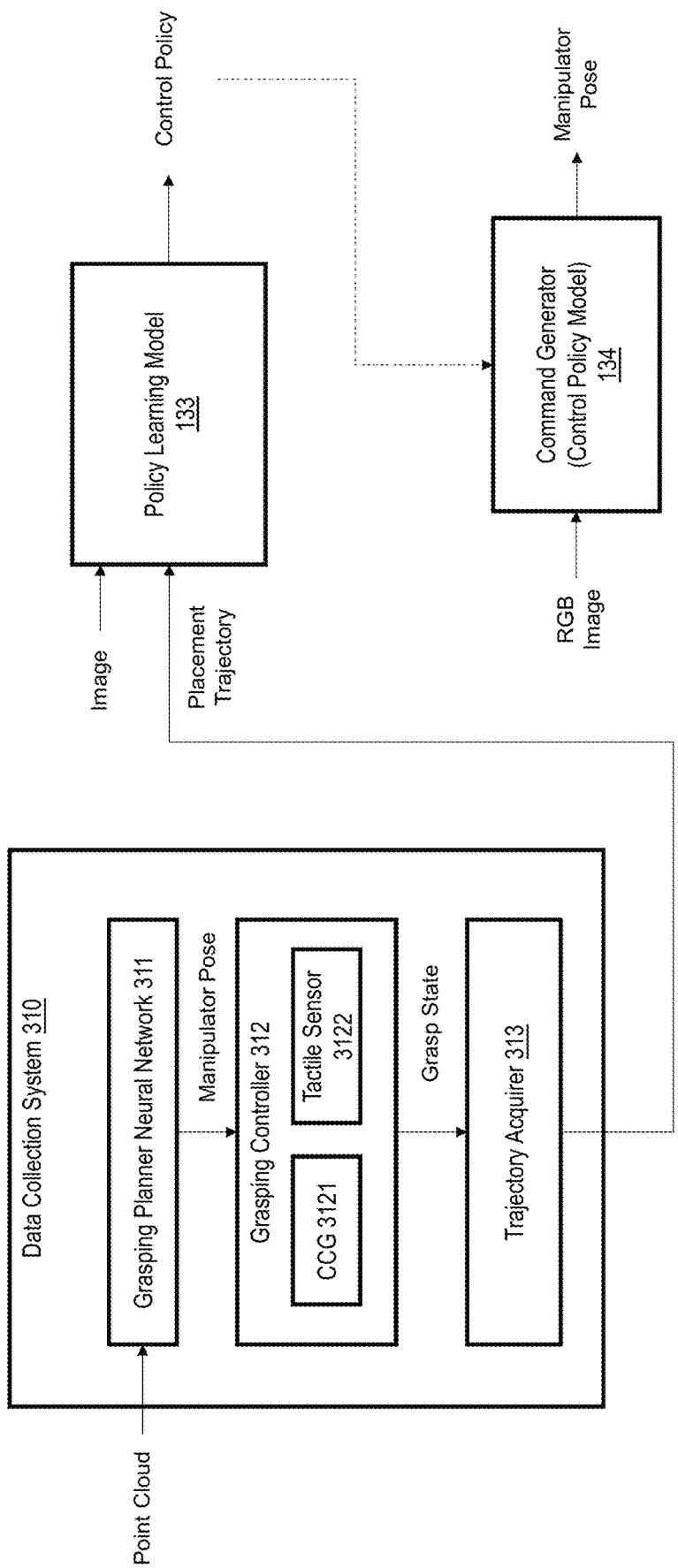
FIG. 3 is a diagram illustrating a method for collecting data for training a policy learning model and performing an object placement task using a control policy model, according to embodiments of the present disclosure.
Figure 4:
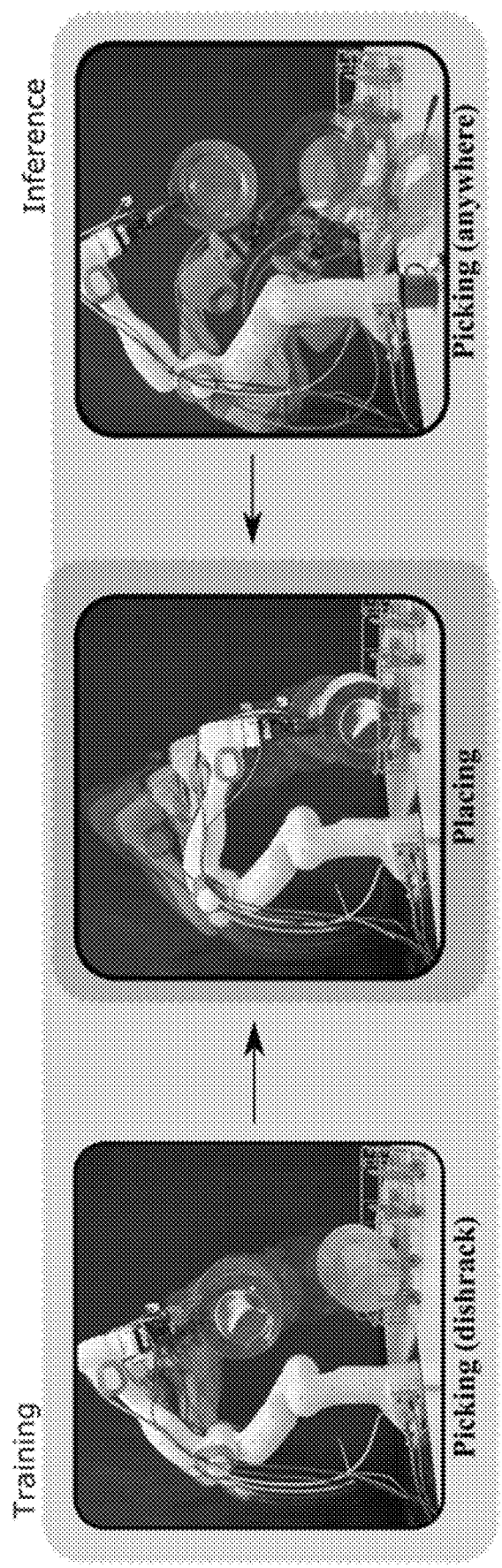
FIG. 4 illustrates a method of picking and placing an object during a training phase and an interference phase according to embodiments of the present disclosure.

FIG. 3 is a diagram illustrating a method for collecting data for training a policy learning model and performing an object placement task using a control policy model, according to embodiments of the present disclosure. FIG. 4 illustrates a method of picking and placing an object during a training phase and an interference phase according to embodiments of the present disclosure.

As shown in FIG. 3, a data collection system 310 may perform a self-supervised data collection method including a cycle with four main phases: (1) grasping planning, (2) grasping, (3) retrieving and (4) placing by retrieving. The data collected by the data collection system 310 is used to train the policy learning model 133 during a training process. It is assumed that objects in a scene are initially in desired placement positions and orientations.

(1) Grasping Planning

During the grasping planning phase, the manipulator 112 positions itself at a predetermined pose, ensuring the vision sensor 120 mounted on the robot (e.g., on the wrist of the robot manipulator) obtains an unobstructed view of objects of interest within the environment. The manipulator 112 may include any one or any combination of an arm, a joint, and an end effector which may include a gripper and/or fingers.

A grasping planner neural network 311 may be used to generate L candidate grasping poses $T_g = \{T_{g,i}\}_{8=0}^{L}$, where $T_{g,i} \in SE(3)$ for all $i \in \{0, \ldots, L\}$, based on a point cloud image of the target object 102 and the scene 104 that is input to the grasping planner neural network 311. For example, Contact-GraspNet may be used as the grasping planning neural network 311. Among an initial set of L candidate grasping poses output from the grasping planner neural network 311, grasping poses that do not belong to any objects of interest are pruned and filtered out, to obtain pruned candidate grasping poses, $\bar{T}_g = \{\bar{T}_{g,i}\}_{i=0}^{L}$, where $K \leq L$ and $\bar{T}_g \subseteq T_g$. For example, the pruning may be performed based on an object class and/or an output of an obstacle detection module. After pruning, a single grasping pose $T_{g,k}$ is randomly selected from the pruned candidate grasping poses $\bar{T}_g$. In order to approach an object of interest without collision, a pre-grasping pose $T_{g,k}^{pre}$ may be determined by adding a translational offset to the grasping pose $T_{g,k}$.

(2) Grasping

During the grasping phase, a grasping controller 312 controls the manipulator 112 to positions the manipulator 112 at the pre-grasping pose $T_{g,k}^{pre}$ and then at the grasping pose $T_{g,k}$ using linear interpolation or spherical linear interpolation. For example, the grasping controller 312 may use a compliant control for grasping (CCG) module 3121 and a tactile sensor 3122 including a tactile regrasping module to control the tool 100 to change the pose of the tool 100.

The CCG module 3121 may use a Cartesian impedance controller to set compliance levels of the manipulator 112 at a plurality of different stages, and may maneuver the manipulator 112 between target poses according to the compliance levels. The term "compliance level" may refer to a degree to which the manipulator 112 is programmed or configured to be flexible or compliant in response to external forces and constraints. The compliance level may represent a translational stiffness level and a rotational stiffness level of a manipulator controller (e.g., a manipulator actuator or the joints 111) of the tool 100, which determine how rigid or flexible the tool 100 is when interacting with the target object 102 in the environment. Higher compliance levels mean that the manipulator 112 is more flexible and can adapt better to external forces and constraints, while lower compliance levels make the manipulator 112 stiffer and less flexible. Compliance control may involve adjusting the stiffness of the joints 111 or the manipulator controller. Stiffness is a measure of how resistant the tool (e.g., robot) 100 is to deformation when subjected to external forces. Higher stiffness means less compliance, while lower stiffness means more compliance.

Prior to engaging the manipulator 112 for grasping (e.g., prior to closing a gripper to perform a grasp), translational stiffness and rotational stiffness of the manipulator controller may be set to minimum values, to facilitate the adaptation of the manipulator 112 to properties and contact constraints of the target object 102 within the environment.

The tactile sensor 3122 operates under the assumption of grasp stability, implying that once the target object 102 is gripped, it remains securely in place without movement or slippage. To address this concern, the tactile sensor 3122 performs tactile sensing to proactively identify the stability of a grasp and initiates a regrasping action if instability is detected.

The tactile sensor 3122 may detect and measure physical interactions, such as pressure, force, or deformation, at contact points on a sensing surface of the tactile sensor 3122. When the tactile sensor 3122 captures an image of a contact area with the contact points, the tactile sensor 3122 may capture and record information regarding the distribution, locations, intensities, and properties of contact points across the sensing surface of the tactile sensor 3122.

The tactile sensor 3122 may include individual sensing elements or cells distributed across the sensing surface. The sensing elements are configured to respond to physical changes, such as pressure or deformation which occurs when the sensing elements are in contact with the target object 102.

When the target object 102 comes into contact with the sensing surface of the tactile sensor 3122, the individual sensing elements underneath the points of contact are activated and act collectively to capture an image of the contact area. Each sensing element corresponds to a specific point on the sensing surface, and a combined response of all the sensing elements provides a representation of the distribution of pressure or force across the contact area.

The grasping controller 312 determines whether a grasp state is stable based on a shape or a distribution pattern of the contact points acquired from the tactile sensor 3122. For example, the grasping controller 312 may identify a center position of the distribution pattern of the contact points, and determine the grasp is stable when the identified center is located within a predetermined range of a stable position. The stable position may be pre-determined based on a shape of the target object. A method of determining grasp state stability and controlling the manipulator 112 to attain a stable grasp state will be discussed later in detail with reference to FIGS. 5-9.

(3) Retrieving

A trajectory acquirer 313 begins the retrieving phase when the grasp state is determined to be stable.

Throughout the retrieval procedure, a manipulator pose and a corresponding timestamp are identified from a sequence of images and stored in a memory while the manipulator 112 moves along a retrieval trajectory. The retrieval trajectory is generated based on a grasping sequence, where the grasping controller 312 controls the manipulator 112 to position the manipulator 112 at the pregrasping pose $T_{g,k}^{pre}$, in compliance with a rotational axis of the manipulator 112. Once at the pregrasping pose $T_{g,k}^{pre}$, a clearance pose $T_{c,k}$ may be randomly selected, which is centered around a fixed pose above a target retrieval place (e.g., a dish rack). Given a fixed clearance pose, random translations that are sampled from $\mathcal{N}(0, \sigma_{tr}^2)$ are added. At the end of the retrieval phase, a dense retrieval trajectory $\tau_r^{expert}$ of length M from the grasping pose $T_{g,k}$ to the clearance pose $T_{c,k}$ is acquired via the pregrasping pose $T_{g,k}^{pre}$ as follows:

$$\tau_r^{expert} = ((T_0, t_0), \ldots, (T_M, t_M)) \qquad \text{Equation (1)}$$

Where $T_0 = T_{g,k}$, and $T_M = T_{c,k} \cdot t_i \in \mathbb{R}_{\geq 0}$ for all $i \in \{0, \ldots, M\}$ are respective timestamps of the retrieval trajectory starting with $t_0 = 0$. To match a desired control frequency of a manipulator control policy, states are sampled $\Delta t$ apart in order to generate an sparse retrieval trajectory $\bar{\tau}_r^{expert}$. A total of $\overline{M}+1$ states are extracted as follows, were $$\overline{M} = \frac{t_M - t_0}{\Delta t}:$$

$\bar{\tau}_r^{expert} = (T_{\Delta t_0}, \ldots, T_{\Delta t_{\overline{M}+1}})$, where $$T_{\Delta t_i} = T_{n^*}, \text{ with } n^* = \arg\min_{n \in \{0, \ldots, M\}} |i \cdot \Delta t - t_n| \qquad \text{Equation (2)}$$

In Equation (2), a nearest pose is identified from the dense retrieval trajectory $\tau_r^{expert}$ at every $\Delta t$ interval.

(4) Placing by Retrieving

During the placing by retrieving phase, the trajectory acquirer 313 reverses the sparse retrieval trajectory $\bar{\tau}_r^{expert}$ into a placement trajectory $\bar{\tau}_p^{expert}$ expressed as global poses.

$$\bar{\tau}_p^{expert} = (T_{\Delta t_{\overline{M}+1}}, \ldots, T_{\Delta t_0}) \qquad \text{Equation (3)}$$

The trajectory acquirer 313 converts the global poses in placement trajectory $\bar{\tau}_p^{expert}$ into relative poses in order to use state differences as expert actions:

$$T_{\Delta cmd,i} = T_{\Delta t_{\overline{M}-i+1}}^{-1} T_{\Delta t_{\overline{M}-i}} \qquad \text{Equation (4)}$$

Where $i \in \{0, \ldots, \overline{M}\}$, and $T_{\Delta cmd,i} \in SE(3)$ is a relative change in the manipulator pose. Six dimensional vectors $[t, \theta]^T$ may be used to represent poses, where $t \in \mathbb{R}^3$ is a translation, and $\theta \in \mathbb{R}^3$ is a rotation vector. The rotation vector is defined as $\theta = \theta_e$, where $\theta \in \mathbb{R}^1$ represents a rotational angle and $e \in \mathbb{R}^3$ represents rotational axes (i.e., x, y, and z rotational axes). The expert action is defined as $a_i = (a_{\Delta cmd,i}, a_{gripper,i})$, where $a_{\Delta cmd,i} = [t_i, \theta_i]^T$ is a six dimensional vector representation of the pose $T_{\Delta cmd,i}$ and $a_{gripper,i} \in \{0, 1\}$ is a binary variable describing the gripper command (i.e., open or close). Robustness of the placement trajectory may be increased via noise removal, which is described below.

To gather an expert data episode, a series of downsampled placement commands, denoted as $\{a_i\}_{i=0}^{\overline{M}}$, are executed, and sequences of observation and actions are stored as an expert trajectory. The sequence of observations may be acquired by capturing RGB images using the vision sensor 120 affixed to the tool 100, where the tool observation space $o_t \in \mathbb{R}^{\omega \times h \times 3}$. During the object placement phase, the tool 100 maintains a gripper of the manipulator 120 in a closed position, meaning that the gripper action is defined as $z_{gripper,i} = 1$ for all $i \in \{0, \ldots, M\}$. At the end of the placement trajectory, the tool 100 is commanded to retain the manipulator 120 in the current pose while opening the gripper for N discrete time steps (i.e., $a_{\Delta cmd,j} = [0, 0, 0, 0, 0, 0]^T$ and $a_{gripper,j} = 0$ for all $j \in \{M+1, \ldots, M+N\}$). For example, N may be set to 5 to give the robot an adequate amount of time to open the gripper and release the target object 102. A single expert demonstration or trajectory is defined as a set of training tuples:

$$\tau_r^{expert} = \{o_t, a_t, o_{t+1}\}_{t=0}^T \qquad \text{Equation (5)}$$

Where a total length of $T = \overline{M} + N$.

In order to increase the coverage of the demonstrations and train a more robust control policy, perturbations are introduced to a predetermined percentage (e.g., 75%) of poses through the application of noise. For example, isotropic Gaussian noise is injected into the demonstration data to achieve persistent excitation, which is a condition where the training data is informative enough to learn a model that is robust to compounding errors during deployment. In detail, a translation of a post t is perturbed as follows:

$$t_{perturbed} = t + \delta t \qquad \text{Equation (6)}$$

Where $\delta t \in \mathbb{R}^3$ is isotropic Gaussian noise and each dimension of $\delta t$ is sampled from $\mathcal{N}(0, 0.5 \text{ cm})$. Similarly, the rotation is perturbed as follows:

$$\theta_{perturbed} = (\theta + \delta \theta)(e + \delta e) \qquad \text{Equation (7)}$$

Where $\delta e \in \mathbb{R}^3$ is isotropic Gaussian noise, and each dimension of $\delta e$ is sampled from $\mathcal{N}(0, \sigma_e)$, and $\delta \theta$ is sampled from $\mathcal{N}(0, \sigma_\theta)$.

Referring to FIGS. 3 and 4, during a training phase, the policy learning model 133 may receive as input a placement trajectory and an image of the target object 102 and the scene 104, and generates as output a control policy model for controlling a pose of the tool 100.

The control policy model $\pi_\phi(a_t|o_t)$ is parameterized by $\phi$, and represents a neural network model trained to generate a tool control policy based on data collected via the LLP method. Behavioral cloning may be used to train the neural network model for generating the control policy, using a likelihood-based loss or objective function. Behavioral cloning may refer to a technique where the neural network model is trained to replicate the behavior of a human or expert by learning from their demonstrated actions. It is a form of supervised learning where the neural network model learns to map input observations to corresponding output actions, mimicking the behavior exhibited in the training data. Given a dataset of $N_{train}$ expert demonstration trajectories, a loss function $\mathcal{L}$ is calculated as follows:

$$\mathcal{L} = \frac{1}{N_{train}} \sum_{i=1}^{N_{train}} \sum_{t=0}^{T} -\log \pi_\phi(a_t | o_t) \qquad \text{Equation (8)}$$

The neural network model for generating the control policy may include one or more convolutional neural networks (CNN), such as ResNET, followed by a multilayer perceptron (MLP) layer that maps an output of the CNN into parameters of the distribution of control actions. The distribution of control actions is represented by a unimodal Gaussian and/or a multimodal mixture of Gaussians.

Referring to FIGS. 3 and 4, in an inference phase, the command generator 134 may use the control policy model to obtain a manipulator pose for placing the target object 102 at a location in the scene 104. The control policy model may be trained by the policy learning model 133, and may receive as input an RGB image or an RGBD image of the target object 102 and the scene 104 and provide as output the manipulator pose for placing the target object 102.

Figure 5:
FIG. 5 is a flowchart illustrating a method of obtaining a placement trajectory according to embodiments of the present disclosure.

FIG. 5 is a flowchart illustrating a method of obtaining an object placement trajectory according to embodiments of the present disclosure.

In operation 510, an object grasping plan is carried out to obtain candidate grasping poses for grasping the target object 102 using the grasping planner neural network 311 such as Contac-GraspNet.

In operation 520, among an initial set of candidate grasping poses output from the grasping planner neural network 311, grasping poses that do not belong to a class of the target object 102 may be pruned and filtered out, to obtain pruned candidate grasping poses. For exampling, when the target object 102 is a plate, pruning may be performed based on the object class "plate" to remove candidate poses for grasping objects (e.g., cups) which are not classified as plates. After pruning, a single grasping pose may be randomly selected from the pruned candidate grasping poses.

In operation 530, the manipulator 112 is controlled to grasp the target object 102 with compliant control using the compliant control for grasping (CCG) module 3121. Prior to engaging a grasping action, the CCG module 3121 may set translational stiffness and rotational stiffness of the manipulator controller (e.g., the joints 111 or the actuator of the manipulator 112) to minimum values, to facilitate the adaptation of the manipulator 112 to properties and contact constraints of the target object 102 in the scene 104.

In operation 540, while the manipulator 112 is grasping the target object 102, the tactile sensor 3122 mounted on the manipulator 112 may capture an image of contact points within a contact area between a sensing surface of the tactile sensor 3122 and the target object 102. The tactile sensor 3122 may include individual sensing elements or cells distributed across the sensing surface. The sensing elements are configured to respond to physical changes, such as pressure or deformation which occurs when the sensing elements are in contact with the target object 102. When the target object 102 comes into contact with the sensing surface of the tactile sensor 3122, the individual sensing elements underneath the points of contact are activated and act collectively to capture the image of the contact area. Each sensing element corresponds to a specific point on the sensing surface, and a combined response of all the sensing elements provides a representation of the distribution of pressure or force across the contact area.

In operation 540, the grasping controller 312 may determine whether the grasp is stable or not based on a shape or a distribution pattern of the contact points. For example, the grasping controller 312 may identify a center position of the distribution pattern of the contact points, and determine the grasp is stable when the identified center is located within a predetermined range of a stable position. The stable position may be pre-determined based on a shape of the target object.

If the grasping controller 312 determines the grasp is unstable, the method proceeds to operation 550 to control the manipulator 112 to re-grasp the target object 102 so that the center position of the distribution pattern of the contact points falls within the predetermined range of the stable position. In particular, the grasping controller 312 may determine a position vector for changing the center position to the predetermined stable position, and generates a robot control command based on the position vector to enable the manipulator 112 to re-grasp the target object 102 based on the robot control command.

If the grasp is determined to be stable, the method proceeds to operation 560 to acquire an object retrieval trajectory based on the stable grasp position of the manipulator 112 and then to acquire an object placement trajectory by reversing the object retrieval trajectory.

Operations 520, 530, and 550 of FIG. 5 will be further discussed with references to FIGS. 6-9 below.

Figure 6:
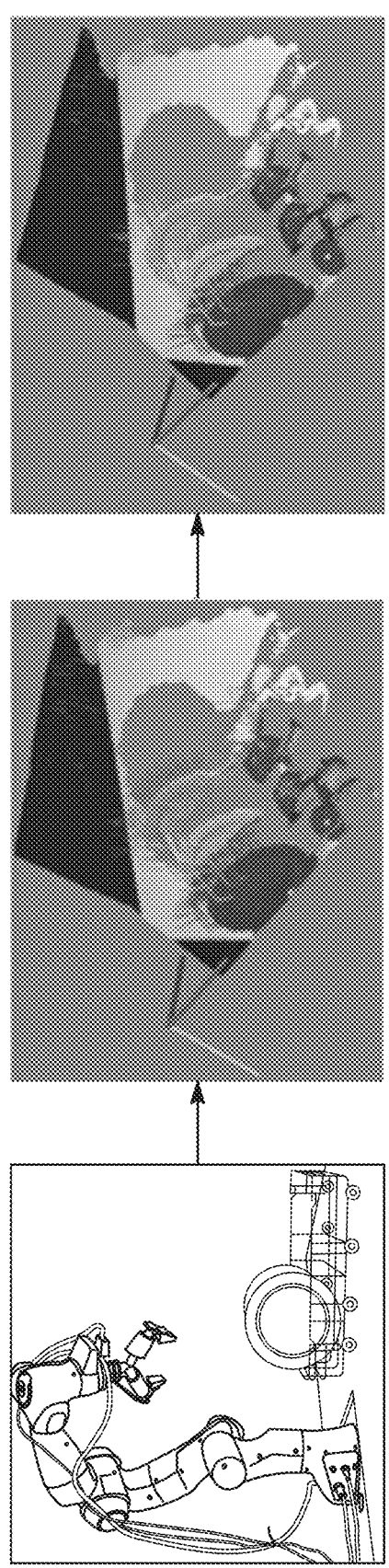
FIG. 6 illustrates a method of pruning candidate grasping pose according to embodiments of the present disclosure.

FIG. 6 illustrates a method of pruning candidate grasping pose according to embodiments of the present disclosure. The method shown in FIG. 6 may correspond to operation 520 of FIG. 5.

In operation 521, the vision sensor 120 may capture an image of the scene 104 including the target object 102, and the image module 132 may generate a point cloud image of the scene 104 via 3D image reconstruction.

In operation 522, the grasping planner neural network 311 receives as input the point cloud image, and generates as output an initial set of candidate grasping poses.

In operation 523, a class of the target object 102 is identified, and from the initial set of candidate grasping poses, grasping poses that do not correspond to objects of the target class are removed. As a result, a set of pruned candidate grasping poses are obtained.

Figure 7:
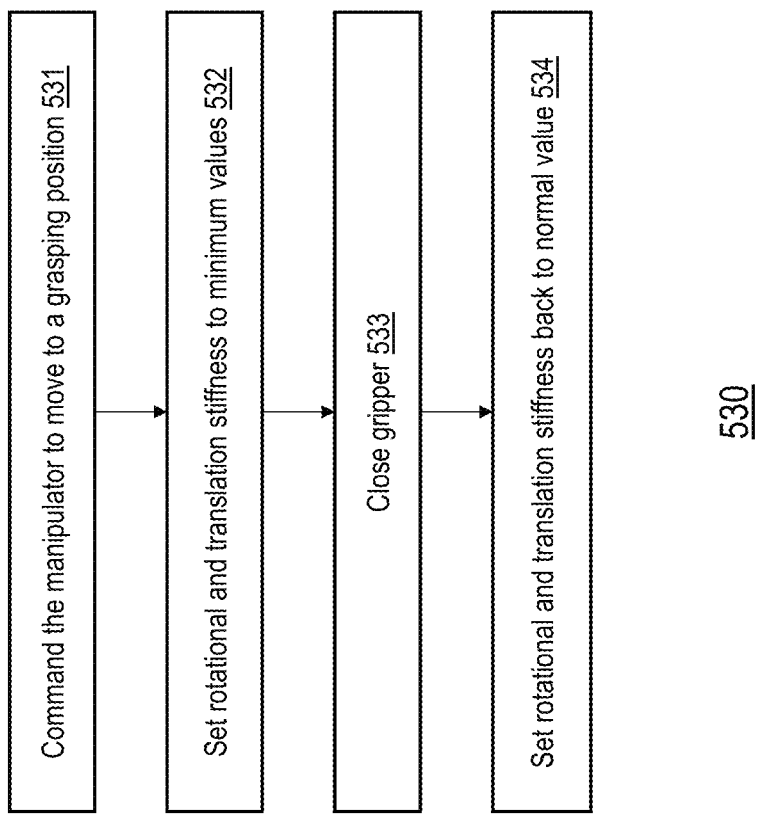
FIG. 7 illustrates a method of grasping an object with complaint control according to embodiments of the present disclosure.

FIG. 7 illustrates a method of grasping an object with complaint control according to embodiments of the present disclosure. The method shown in FIG. 7 may correspond to operation 530 of FIG. 5.

In operation 531, the manipulator 112 is commanded to move to a grasping position which is selected from the pruned candidate grasping poses.

In operation 532, prior to taking a grasping action, the compliant control for grasping (CCG) module 3121 may set translational stiffness and rotational stiffness of the manipulator controller (e.g., the joints 111 or the actuator of the manipulator 112) to predetermined minimum values, to facilitate the adaptation of the manipulator 112 to properties and contact constraints of the target object 102 in the scene 104.

In operation 533, a gripper mounted at the manipulator 112 is closed to securely grasp the target object 102, with the translational stiffness and rotational stiffness of the manipulator controller set to the minimum values.

In operation 534, following the grasping action, the translational stiffness and rotational stiffness are set to a predetermined normal value.

Figure 8:
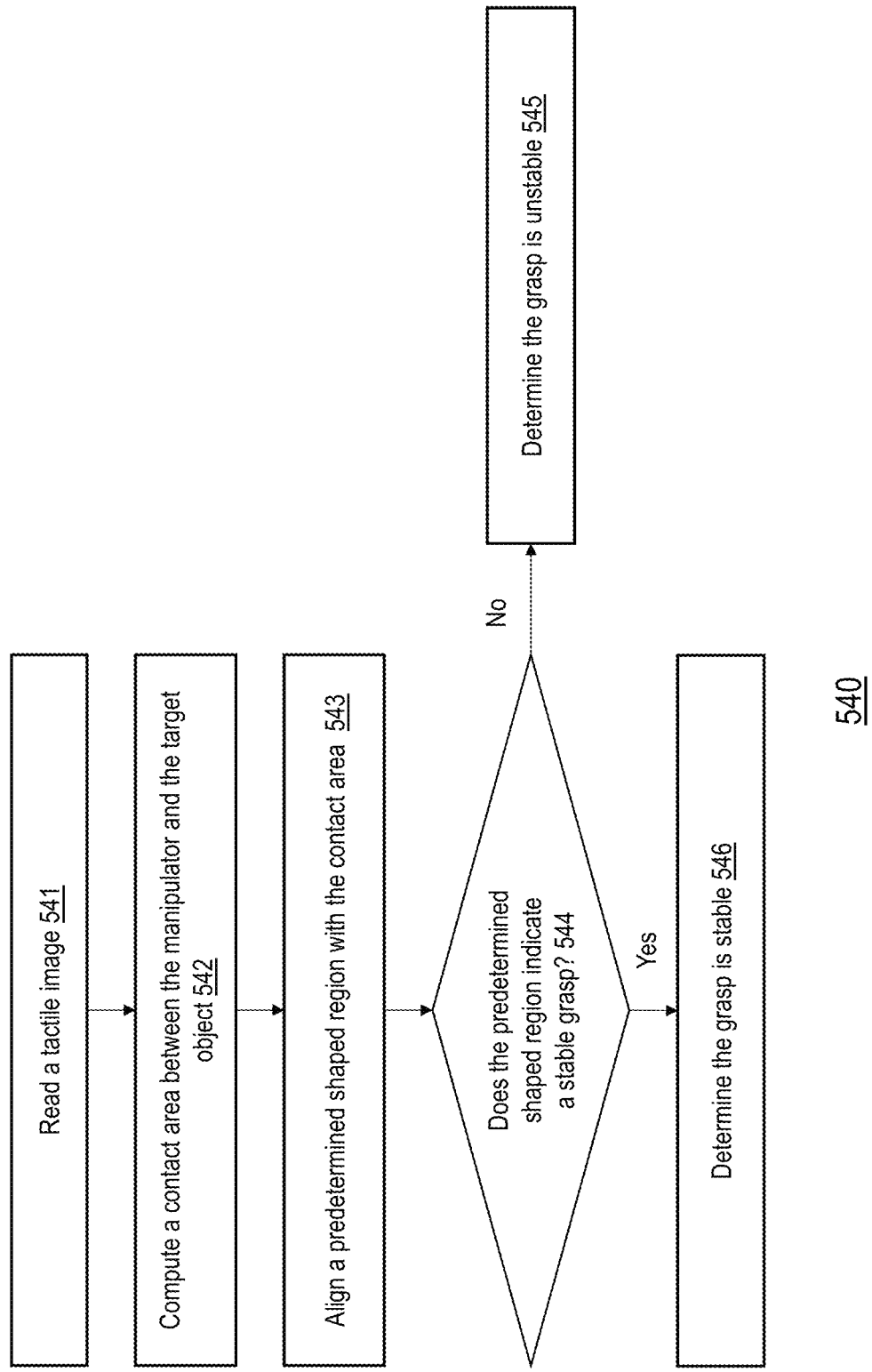
FIGS. 8 and 9 illustrate a method of determining a grasp state is stable according to embodiments of the present disclosure.
Figure 9:
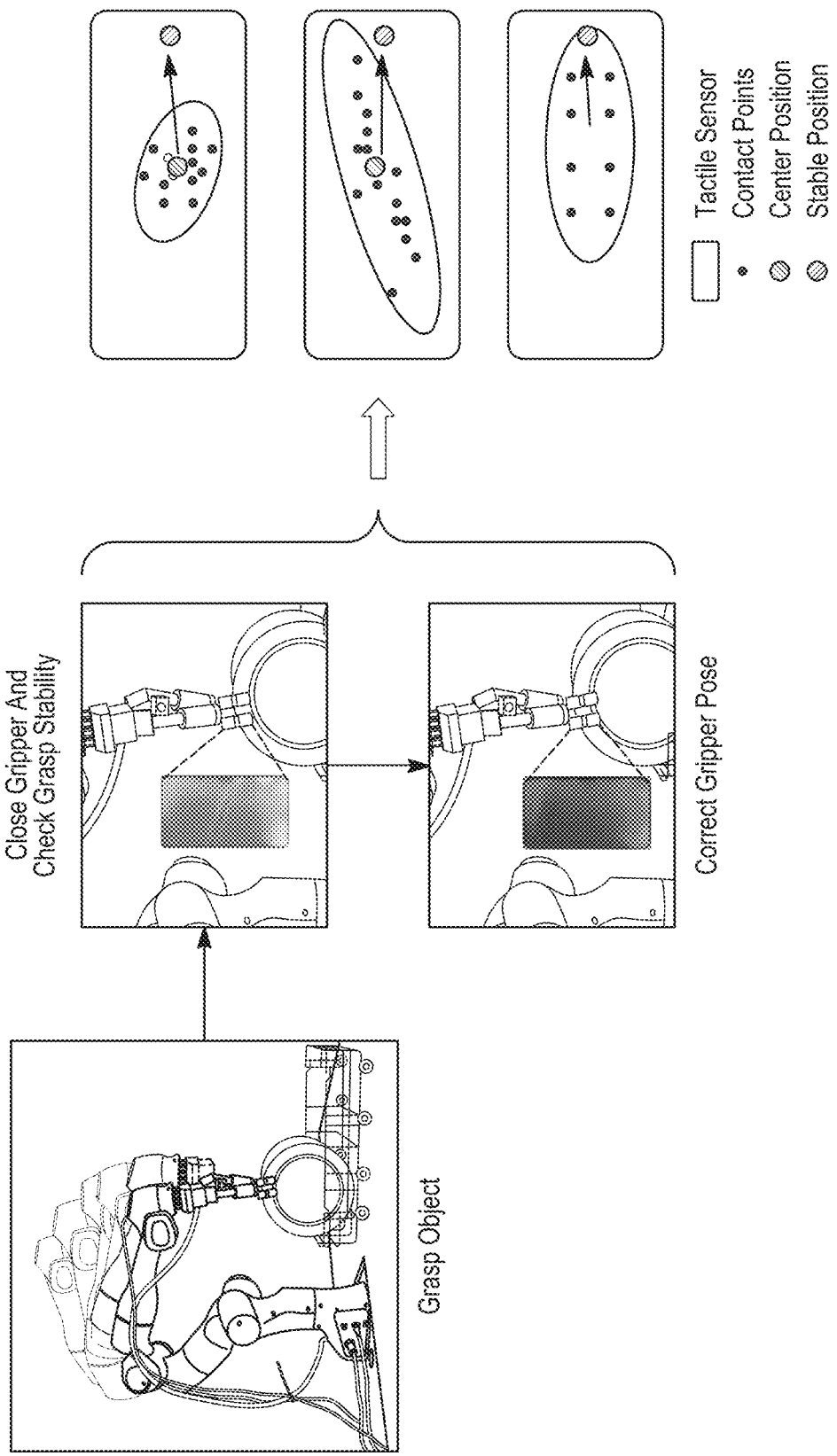

FIGS. 8 and 9 illustrate a method of determining a grasp state is stable according to embodiments of the present disclosure. The method shown in FIG. 8 may correspond to operation 540 of FIG. 5.

Referring to FIG. 8, in operation 541, the grasping controller 312 reads a tactile image captured by the tactile sensor 3122 which is mounted on the manipulator 112.

In operation 542, the grasping controller 312 computes a contact area between the manipulator 112 and the target object 102 based on the tactile image that shows contact points between a sensing surface of the tactile sensor 3122 and the target object 102.

In operation 543, the grasping controller 312 aligns a predetermined shaped region (e.g., an eclipse region) with the contact area including the contact points, so that the predetermined shaped region encompasses all the contact points as shown in FIG. 9.

Referring to FIGS. 8 and 9, in operation 544, the grasping controller 312 determines whether the predetermined shaped region indicates that the current grasp is a stable grasp. Specifically, the grasping controller 312 identifies a center point of the predetermined shaped region and measures a distance between the center point and a stable position. The stable position is pre-determined based on a shape of the target object 102.

When the distance between the center point and the stable position exceeds a predetermined range, the grasping controller 312 identifies the current grasp as unstable in operation 545 and proceeds to adjust the grasp pose of the manipulator 112. The grasp pose is adjusted to bring the center position closer to the stable position, ensuring the center position falls within the predetermined range.

When the distance between the center point and the stable position is within the predetermined range, the grasping controller 312 determines that the current grasp is stable in operation 546. When the current grasp is stable, the grasping controller 312 commands the manipulator 112 to execute an object retrieval action while maintaining the current grasp state. The data collection system 310 may record an object retrieval trajectory while the manipulator 112 is executing the object retrieval action, and derive an object placement trajectory by reversing the object retrieval trajectory.

Figure 10:
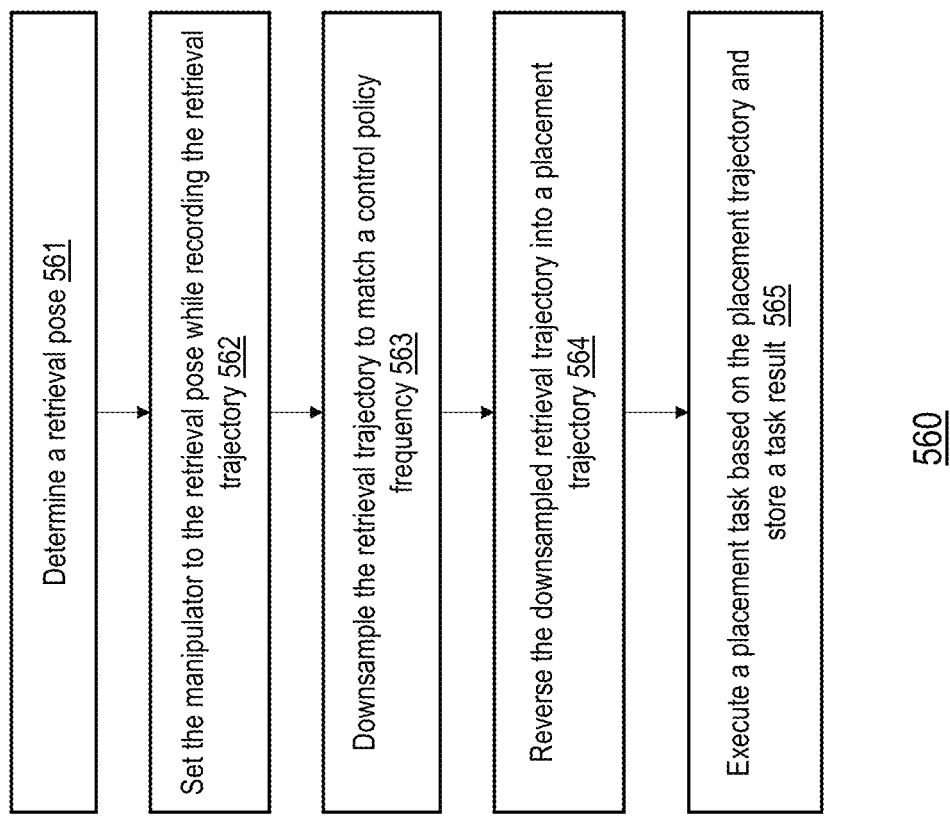
FIG. 10 illustrates a method of obtaining an object placement trajectory and reversing the object placement trajectory from the object retrieval trajectory according to embodiments of the present disclosure.

FIG. 10 illustrates a method of obtaining an object placement trajectory and reversing the object placement trajectory from the object retrieval trajectory according to embodiments of the present disclosure. The method shown in FIG. 10 may correspond to operation 560 shown in FIG. 5.

In operation 561, a retrieval pose is determined based on a retrieval trajectory that extends from the grasping pose to a clearance pose (e.g., a standby pose of the manipulator 112 before initiating a retrieval task or a placement task).

In operation 562, the manipulator 112 is set to the retrieval pose while recording the retrieval pose as an object placement trajectory. The retrieval pose and a corresponding timestamp are stored while the manipulator 112 moves along the retrieval trajectory.

In operation 563, the object placement trajectory is downsampled to match a control policy frequency of the control policy model for performing an object placement task. For example, if the original object placement trajectory includes 24 retrieval poses spaced at 0.2 second intervals, downsampling is performed on the object placement trajectory so that the downsampled object placement trajectory includes 12 retrieval poses at 0.4 second intervals, to match the control policy frequency.

In operation 564, the downsampled object placement trajectory is reversed into an object placement trajectory, for example, using Equations (3)-(5).

In operation 565, the object placement task is executed based on the object placement trajectory, and a result of the object placement task is stored. The result of the object placement task is used as training data for the policy learning model 133 as shown in FIG. 3.

Figure 11:
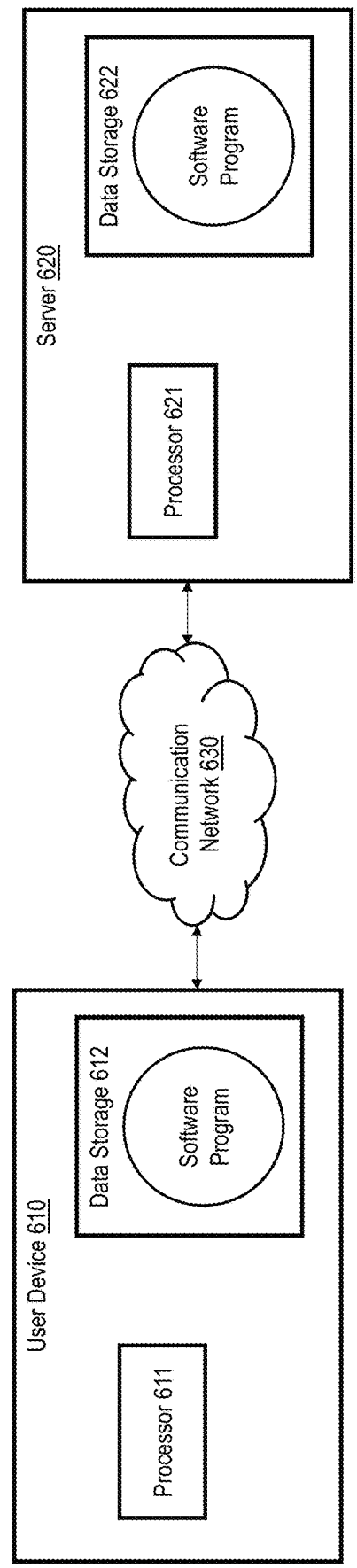
FIG. 11 is a diagram of devices for generating a robot control policy and performing an object placement task using the robot control policy, according to embodiments.

FIG. 11 is a diagram of devices for generating a robot control policy and performing an object placement task using the robot control policy according to embodiments. FIG. 11 includes a user device 610, a server 620, and a communication network 630. The user device 610 and the server 620 may interconnect via wired connections, wireless connections, or a combination of wired and wireless connections.

The user device 610 includes one or more devices (e.g., a processor 611 and a data storage 612) configured to retrieve an image corresponding to a search query. For example, the user device 610 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses, a smart watch, etc.), a home appliance (e.g., a robot vacuum cleaner, a smart refrigerator, etc.), or a similar device. The data storage 612 of the user device 610 may include at least one of the data collection system 310, the policy learning model 133, and the control policy model generated from the policy learning model 133. When the policy learning model 133 is stored in the server 602 instead of being stored in the user device 610, the server 602 may train the policy learning model 133 and provides the user device 610 with the pre-trained policy learning model 133.

The server 620 includes one or more devices (e.g., a processor 621 and a data storage 622) configured to train the control policy model. The data storage 622 of the server 620 may include at least one of the data collection system 310, the policy learning model 133, and the control policy model generated from the policy learning model 133.

The communication network 630 includes one or more wired and/or wireless networks. For example, network 1300 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) may perform one or more functions described as being performed by another set of devices.

FIG. 12 is a diagram of components of one or more electronic devices of FIG. 11 according to an embodiment. An electronic device 1000 in FIG. 12 may correspond to the user device 610 and/or the server 620.

FIG. 12 is for illustration only, and other embodiments of the electronic device 1000 could be used without departing from the scope of this disclosure. For example, the electronic device 1000 may correspond to a client device or a server.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 may correspond to the computer system 130 illustrated in FIG. 1B, and/or may include at least one of the data collection system 310, the policy learning model 133, and the control policy model generated from the policy learning model 133. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020. In particular, the memory 1030 may store at least one of the data collection system 310, the policy learning model 133, and the control policy model generated from the policy learning model 133.

The applications 1034 include the above-discussed embodiments. These functions can be performed by a single application or by multiple applications that each carry out one or more of these functions. For example, the applications 1034 may include an artificial intelligence (AI) model for performing operations 200 and 500 illustrated in FIGS. 2 and 5.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may enable communication between the electronic device 1000 and other external devices, via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 1044 may receive images from an external device, such as a server.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors such as the vision sensor 120 for capturing images of scenes, and the tactile sensor 3122 to detect contact points between the manipulator 112 and the target object 102. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000. The sensor(s) 1046 may receive a text and/or a voice signal that contains one or more queries.

The policy learning model and the control policy model may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The data collection system, the policy learning model and the control policy model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server.

The foregoing disclosure provides illustration and description, but is not intended to be exhaustive or to limit the implementation to the precise form disclosed. Modifications and variations are possible in light of the above disclosure or may be acquired from practice of the implementation.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A model related to the neural networks described above may be implemented via a software module. When the model is implemented via a software module (for example, a program module including instructions), the model may be stored in a computer-readable recording medium.

Also, either one or both of the policy learning model and the control policy model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for controlling a robot including a manipulator, the electronic device comprising:
one or more processors configured to:
acquire an image of a scene including a target object;
input the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and
command the robot to position the manipulator according to the object placement pose, to place the target object at a designated location,
wherein the data collection system is configured to obtain a first set of manipulator grasping poses, obtain a second set of manipulator grasping poses by pruning grasping poses that do not belong to an object class of interest, from the first set of grasping poses, determine a grasping pose from the second set of manipulator grasping poses, and obtain the object retrieval trajectory that extends from the determined grasping pose to a clearance pose.

2. The electronic device of claim 1, further comprising a vision sensor configured to capture the image of the scene including the target object.

3. The electronic device of claim 1, wherein the object placement pose of the manipulator that is output from the control policy model comprises:
information of rotational positions comprising a yaw angle, a pitch angle, and a roll angle of the manipulator; and
information of transitional positions comprising an x-direction position, a y-direction position, and a z-direction position of the manipulator.

4. The electronic device of claim 1, wherein the data collection system is configured to:
obtain the first set of manipulator grasping poses via a grasping planning neural network.

5. The electronic device of claim 1, wherein the data collection system comprises a tactile sensor mounted on the manipulator and is configured to:
identify a center position of a plurality of contact points in a contact area between the tactile sensor and the target object;
determine a position vector for changing the center position of the plurality of contact points to a predetermined stable position; and
output a robot control command based on the position vector.

6. The electronic device of claim 5, wherein the data collection system is configured to command the robot to re-grasp the target object based on the robot control command including the position vector to acquire the object retrieval trajectory.

7. The electronic device of claim 1, wherein the data collection system is further configured to:
determine a retrieval pose of the manipulator based on a movement path extending from the grasping pose to the clearance pose of the manipulator;
position the manipulator according to the retrieval pose and store the retrieval pose to generate the object retrieval trajectory based on the retrieval pose;
downsample the object retrieval trajectory to match a predetermined control policy frequency;
reverse the downsampled object retrieval trajectory into the object placement trajectory; and
generate the control policy model by training a policy learning model based on the object placement trajectory and the image of the scene including the target object.

8. The electronic device of claim 1, wherein the data collection system is configured to command the robot to position the manipulator at a grasping position, change a rotational stiffness level and a translational stiffness level of the manipulator from original values to predetermined minimum values, command the robot to close a gripper of the manipulator, and acquire the object retrieval trajectory while the rotational stiffness level and the translational stiffness level are set to the predetermined minimum values.

9. The electronic device of claim 1, the control policy model comprises one or more convolutional neural networks (CNNs), followed by a multilayer perceptron (MLP) layer that maps an output of the CNNs into parameters of a distribution of robot control actions.

10. A method for controlling a robot including a manipulator, the method comprising:
    acquiring an image of a scene including a target object;
    inputting the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and
    commanding the robot to position the manipulator according to the object placement pose, to place the target object at a designated location,
    wherein the data collection system is configured to obtain a first set of manipulator grasping poses, obtain a second set of manipulator grasping poses by pruning grasping poses that do not belong to an object class of interest, from the first set of grasping poses, determine a grasping pose from the second set of manipulator grasping poses, and obtain the object retrieval trajectory that extends from the determined grasping pose to a clearance pose.

11. The method of claim 10, wherein the object placement pose of the manipulator comprises:
    information of rotational positions comprising a yaw angle, a pitch angle, and a roll angle of the manipulator; and
    information of transitional positions comprising an x-direction position, a y-direction position, and a z-direction position of the manipulator.

12. The method of claim 10, further comprising acquiring the object retrieval trajectory by:
    obtaining the first set of manipulator grasping poses via a grasping planning neural network.

13. The method of claim 10, wherein a tactile sensor mounted on the manipulator, and the method further comprises acquiring the object retrieval trajectory by:
    identifying a center position of a plurality of contact points in a contact area between the tactile sensor and the target object;
    determining a position vector for changing the center position of the plurality of contact points to a predetermined stable position;
    outputting a robot control command based on the position vector to place the manipulator at the predetermined stable position; and
    acquiring the object retrieval trajectory by executing an object retrieval task from the predetermined stable position.

14. The method of claim 10, further comprising acquiring the object placement trajectory by:
    downsampling the object retrieval trajectory to match a predetermined control policy frequency;
    reversing the downsampled object retrieval trajectory into the object placement trajectory; and
    generating the control policy model by training a policy learning model based on the object placement trajectory and the image of the scene including the target object.

15. The method of claim 10, further comprising acquiring the object retrieval trajectory by:
    commanding the robot to position the manipulator at a grasping position;
    changing a rotational stiffness level and a translational stiffness level of the manipulator from original values to predetermined minimum values;
    commanding the robot to close a gripper of the manipulator, and
    acquiring the object retrieval trajectory while the rotational stiffness level and the translational stiffness level are set to the predetermined minimum values.

16. The method of claim 10, the control policy model comprises one or more convolutional neural networks (CNNs), followed by a multilayer perceptron (MLP) layer that maps an output of the CNNs into parameters of a distribution of robot control actions.

17. A non-transitory computer-readable storage medium storing instructions executable by one or more processors to perform a method for controlling a robot including a manipulator, the method comprising:
    acquiring an image of a scene including a target object;
    inputting the image into a control policy model to obtain an object placement pose of the manipulator, as an output of the control policy model, wherein the control policy model is generated using data collected by a data collection system that is configured to acquire an object retrieval trajectory by observing a robot movement for object retrieval, and reverse the object retrieval trajectory into an object placement trajectory; and
    commanding the robot to position the manipulator according to the object placement pose, to place the target object at a designated location,
    wherein the data collection system is configured to obtain a first set of manipulator grasping poses, obtain a second set of manipulator grasping poses by pruning grasping poses that do not belong to an object class of interest, from the first set of grasping poses, determine a grasping pose from the second set of manipulator grasping poses, and obtain the object retrieval trajectory that extends from the determined grasping pose to a clearance pose.

18. The non-transitory computer-readable storage medium of claim 17, wherein the method further comprises acquiring the object retrieval trajectory by:
    commanding the manipulator to grasp the target object at a grasping position;
    determining whether the manipulator is in a stable grasp state based on aan tactile sensor image showing contact points between the manipulator and the target object;
    controlling the manipulator to re-grasp the target object based on the manipulator being in an unstable grasp state; and
    based on the manipulator being in the unstable grasp state, controlling the manipulator to move from the grasping position to a clearance position to acquire the object retrieval trajectory.

19. The non-transitory computer-readable storage medium of claim 18, wherein the method further comprises acquiring the object retrieval trajectory by:
    setting rotational and translational stiffness levels to predetermined minimum levels while the manipulator moves from the grasping position to the clearance position to acquire the object retrieval trajectory.

* * * * *